3,144,750
POLYCYCLIC ALCOHOLS AS HYPERGOLIC FUELS
James T. Edmonds, Jr., and Cleveland R. Scott, Bartlesville, Okla., assignors to Phillips Petroleum Company, a corporation of Delaware
Filed Dec. 10, 1951, Ser. No. 260,944
7 Claims. (Cl. 60—35.4)

This invention relates to rocket propellants. In one of its more specific aspects this invention relates to hypergolic fuels and their application to the propulsion of rockets.

Our invention is concerned with new and novel rocket propellants and their utilization; a rocket or jet propulsion device, being defined herein as a rigid container for matter and energy so arranged that a portion of the matter can absorb energy in kinetic form and subsequently be ejected in a specified direction. The type rocket to which our invention is applied is that type of jet propulsion device designated as a "pure" rocket, i.e., a thrust producer which does not make use of the surrounding atmosphere. A rocket of the type with which our invention is concerned is propelled by introduction of a propellant material into a combustion chamber therein, and burning it under conditions that will cause it to release energy at a high but controllable rate immediately after entry into the combustion chamber. Rocket propellants, as liquids, are advantageously utilized inasmuch as the liquid propellant material can be carried in a light weight, low pressure vessel and pumped into the combustion chamber, the latter though it must withstand high pressure and temperature, being only necessarily large enough to insure combustion. Also, the flow of liquid propellant into the combustion chamber can be regulated at will so that the thrust, continuous or in intermittent bursts of power, can be sustained, the latter type of liquid propellant flow contributing to a longer life of the combustion chamber and thrust nozzle.

Various liquids and liquid combinations have been found useful as rocket propellants. Some propellants consist of a single material, and are termed "monopropellant." Those propellants involving two materials are termed "bipropellants" and normally consist of an oxidizer and a fuel. Hydrogen peroxide and nitromethane are each well known monopropellants. Well known bipropellants include hydrogen peroxide or liquid oxygen as the oxidant with a fuel component such as ethyl alcohol-water, ammonia, hydrazine, or hydrogen; and nitric acid as the oxidizer with aniline or furfuryl alcohol as the hypergolic fuel component.

When employing 90–100 percent or more nitric acid, i.e., "white fuming nitric acid" as the oxidizer in a rocket bipropellant, it is often necessary, dependent on the specific fuel component, to make ignition more prompt by dissolving from 6 to 14 percent by weight of nitrogen dioxide in the white fuming nitric acid forming thereby "red fuming" nitric acid. A fuel component of a bipropellant material of the type described herein, is spontaneously ignited upon contacting the oxidizer, and for that reason is referred to herein as being "hypergolic". A ratio of oxidizer to hypergolic fuel based on stoichiometric amounts can be utilized within the limits of 0.5: to 1.5:1 if desired, the efficiency of the combustion being less at ratios below 1:1 and the use of the oxidizer being less economical at ratios above 1:1. However practical considerations may necessitate the use of higher ranges, even as high as 6:1.

An object of this invention is to provide new rocket propellants. Another object is to provide hypergolic fuels. Another object is to provide a method for producing immediate thrust to a rocket. Other objects will be apparent to those skilled in the art from the accompanying discussion and disclosure.

In accordance with our invention we have provided rocket bipropellant materials the fuel component of which comprises a polycyclic alcohol characterized by the structural formula

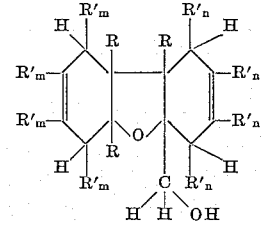

wherein R is selected from the group consisting of a hydrogen atom and a methyl radical, at least one R being hydrogen, wherein R' is selected from the group consisting of a hydrogen atom and an alkyl group having not more than three carbon atoms, wherein the sum of the carbon atoms in the $R'_m$ and the sum of the carbon atoms in the $R'_n$ in each case is not greater than three and wherein at least two of the $R'_m$ and at least two of the $R'_n$ are hydrogen atoms. These polycylic alcohols can be prepared by the reduction of the corresponding aldehydes to alcohols by means of the crossed Cannizzaro reaction, see Organic Chemistry, Gilman Second Edition, volume 1, page 649 published by John Wiley and Sons. The preparation of these corresponding aldehydes is taught and described in the copending patent application of J. C. Hillyer and D. A. Nicewander filed March 14, 1949, Serial Number 81,413, now Patent No. 2,863,151, the disclosures of which are herein incorporated and made a part of this disclosure.

The polycyclic alcohols of this invention are hypergolic when diluted with non-hypergolic fuels, particularly hydrocarbons, even in a state of dilution as high as 70 percent by volume non-hypergolic diluent and in some cases as high as 80–90 percent by volume non-hypergolic diluent. Suitable non-hypergolic diluents include the normally liquid hydrocarbons or mixtures thereof such as a liquid petroleum fraction, n-heptane, toluene, isooctane, benzene, diisobutylene gasoline, jet fuels, kerosenes, and the like.

Illustrative of the polycyclic alcohols suitable for use in our invention are 2,3,4,5-bis($\Delta^2$-butenylene)-tetrahydrofurfuryl alcohol,
3-methyl-2,3,4,5-bis($\Delta^2$-butenylene)-tetrahydrofurfuryl alcohol,
4-methyl-2,3,4,5-bis(3-methyl-$\Delta^2$-butenylene)-tetrahydrofurfuryl alcohol,
3,5-dimethyl-2,3,4,5-bis(2,3,dimethyl-$\Delta^2$-butenylene)-tetrahydrofurfuryl alcohol,
2,3(2-isopropyl-$\Delta^2$-butenyl)-4,5(4-methyl-$\Delta^2$-butenylene)-tetrahydrofurfuryl alcohol, and
5-methyl-2,3(2-methyl-$\Delta^2$-butenylene)-4,5(2-ethyl-$\Delta^2$-butenylene)-tetrahydrofurfuryl alcohol as well as their higher and lower molecular weight homologues. A particularly preferred polycyclic alcohol is 2,3,4,5-bis($\Delta^2$-butenylene) - tetrahydrofurfuryl alcohol.

Suitable oxidizers which may be used in our invention in addition to white or red fuming nitric acid are hydrogen peroxide, ozone, nitrogen tetroxide, oxygen, and mixed acids especially anhydrous mixtures of nitrogen and sulfonic acids such as 80–90 percent by volume white or red fuming nitric acid and 10–20 percent by volume anhydrous or fuming sulfuric acid. It is within the scope of this invention to employ preferably dissolved in the oxidizer, ignition or oxidation catalysts. These oxidation catalysts include certain metal salts such as the chlorides and naphthenates of iron, zinc, cobalt and similar heavy materials.

The operation and advantages of this invention are illustrated by the following examples. The reactants and their proportions and their specific ingredients are presented as being typical and are not to be construed to limit the invention.

EXAMPLE I

*Preparation of 2,3,4,5-Bis($\Delta^2$-Butenylene)Tetrahydrofurfuryl Alcohol*

A run was made wherein 250 grams of potassium hydroxide was dissolved in 375 ml. of methyl alcohol and the solution so formed added with stirring over a period of 30 minutes to 306 grams of 2,3,4,5-bis($\Delta^2$-butenylene)-tetrahydrofurfural, said 2,3,4,5-bis($\Delta^2$-butenylene)-tetrahydrofurfural being dissolved in 150 ml. of 40 weight percent aqueous formaldehyde and 400 ml. of methyl alcohol. Temperature of the reaction mixture during said addition was maintained at 50–60° C. Temperature of the reaction mixture was maintained at about 60° C. for 3 hrs. after the addition was completed. Methanol was removed by vacuum distillation and 450 ml. of water was then added. Phase separation occurred, the bottom layer being the aqueous layer. The top layer, containing most of the product, was removed. The bottom layer was extracted with three 200 ml. portions of benzene. The benzene extract and the top layer were combined and washed with five 50 ml. portions of water. Benzene was removed by vacuum distillation to provide 275.1 grams of crude 2,3,4,5-bis($\Delta^2$-butenylene)-tetrahydrofurfuryl alcohol. The crude alcohol was a light yellow, viscous liquid which slowly crystallized on standing at room temperature (25° C.). Said crude alcohol was used in the hypergolic test described in Example II.

The crude product was distilled under vacuum to provide pure 2,3,4,5-bis($\Delta^2$-butenylene)-tetrahydrofurfuryl alcohol which was a white crystalline solid having a melting point of 33–35° C., a refractive index $n_D^{20}$ 1.5335, and a hydroxyl number of 259. The pure product was readily soluble in benzene, isopentane, n-pentane, n-heptane, methanol, and ethanol. The 2,4-dinitrobenzoate derivative of said 2,3,4,5-bis($\Delta^2$-butenylene)-tetrahydrofurfuryl alcohol had a melting point of 75–77° C.

EXAMPLE II

The materials described below were tested for spontaneous ignition employing fuming nitric acid as the oxidizer. In each test one part by volume of a n-heptane solution containing the candidate polycyclic alcohol was dropped into a vessel containing 2.3 parts by volume fuming nitric acid. Normal heptane was employed as the hydrocarbon non-hypergolic diluent to determine the maximum dilution which the candidate polycyclic alcohol would withstand and still retain the property of hypergolicity. The polycyclic alcohol solution upon coming into contact with the fuming nitric acid ignited spontaneously. These tests were conducted at room temperature, about 70° F. The results are set forth in Table No. 1.

TABLE NO. 1

| Compound | Oxidant | Maximum Dilution, percent n-Heptane |
|---|---|---|
| Crude 2,3,4,5-bis($\Delta^2$-butenylene)-tetrahydrofurfuryl alcohol. | Red Fuming Nitric Acid. | 70 |
| Do | White Fuming Nitric Acid. | 70 |
| 2,3,4,5-bis($\Delta^2$-butenylene)-tetrahydrofurfuryl alcohol. | Red Fuming Nitric Acid. | 70 |
| Do | White Fuming Nitric Acid. | 70 |

Solid 2,3,4,5-bis($\Delta^2$-butenylene)tetrahydrofurfuryl alcohol was also hypergolic in contact with red and white fuming nitric acid.

As an added feature of this invention the polycyclic alcohol are also useful for providing fast burning fuels suitable for use in rocket engines and the like where a hypergolic fuel is not necessarily required. For example, the fuel component of this invention dissolved in a liquid hydrocarbon such as a gasoline, a jet fuel, a kerosene, a naphtha or a petroleum fraction having a boiling point usually not greater than 800° F. even if the resulting solution is not hypergolic with an oxidant such as fuming nitric acid, can be used together with an oxidant and a suitable igniter as a rocket propellant. These fast burning fuels are particularly useful if for various reasons a hypergolic fuel is not desired or required. The polycyclic alcohols of this invention may be added to a hydrocarbon liquid in a minor amount, usually from about 1 to 20 percent by volume of the total mixture to produce fast burning fuels. Suitable fuels are 1–20 percent by volume 2,3,4,5-bis($\Delta^2$-butenylene)-tetrahydrofurfuryl alcohol or 3-methyl-2,3,4,5-bis($\Delta^2$-butenylene)-tetrahydrofurfuryl alcohol or 4 - methyl - 2,3,4,5-bis(3-methyl-$\Delta^2$-butenylene)-tetrahydrofurfuryl alcohol or 3,5-dimethyl - 2,3,4,5 - bis(2,3-dimethyl-$\Delta^2$-butenylene)-tetrahydrofurfuryl alcohol or 2,3(2-isopropyl-$\Delta^2$-butenyl)-4,5(4-methyl-$\Delta^2$-butenylene) - tetrahydrofurfuryl alcohol or 5-methyl-2,3(2-methyl - $\Delta^2$ - butenylene)-4,5(2-ethyl-$\Delta^2$-butenylene)-tetrahydrofurfuryl alcohol or mixtures thereof and 80–99 percent by volume of a petroleum fraction in the gasoline boiling range.

As will be evident to those skilled in the art, various modifications can be made or followed in the light of the foregoing disclosure and discussion without departing from the spirit or scope of this invention.

We claim:
1. In the method for developing thrust by the combustion of bipropellant components in a combustion chamber of a reaction motor the steps comprising separately and simultaneously injecting a stream of an oxidant component and a fuel component into contact with each other in the combustion chamber of said motor, in such proportions as to produce spontaneous ignition, said fuel component comprising an alcohol characterized by the structural formula

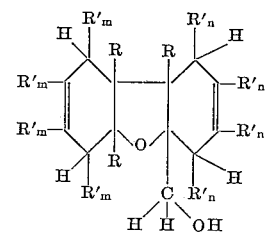

wherein R is selected from the group consisting of hydrogen atom and a methyl radical, at least one R being a hydrogen atom, wherein R' is selected from the group consisting of a hydrogen atom and an alkyl radical having not more than three carbon atoms, wherein the sum of the carbon atoms in the $R'_m$ and the sum of the carbon atoms in the $R'_n$ in each case is not greater than three and wherein at least two of the $R'_m$ and at least two of the $R'_n$ are hydrogen atoms.

2. The method of claim 1 wherein said fuel component is 2,3,4,5-bis($\Delta^2$-butenylene)-tetrahydrofurfuryl alcohol.

3. The method of claim 1 wherein said fuel component is dissolved in a non-hypergolic liquid hydrocarbon.

4. The method of claim 1 wherein said fuel component is 3-methyl-2,3,4,5-bis($\Delta^2$-butenylene)-tetrahydrofurfuryl alcohol.

5. The method of claim 1 wherein said fuel component is 4 - methyl - 2,3,4,5-bis(3-methyl-$\Delta^2$-butenylene)-tetrahydrofurfuryl alcohol.

6. The method of claim 1 wherein said fuel component is 3,5-dimethyl-2,3,4,5-bis(2,3-dimethyl-$\Delta^2$-butenylene)-tetrahydrofurfuryl alcohol.

7. The method of claim 1 wherein said fuel component is 2,3(2 - isopropyl - $\Delta^2$ - butenyl)-4,5(4-methyl-$\Delta^2$-butenylene)-tetrahydrofurfuryl alcohol.

References Cited in the file of this patent

UNITED STATES PATENTS

| | | |
|---|---|---|
| 2,028,308 | Wilke | Jan. 21, 1936 |
| 2,474,183 | King | June 21, 1949 |
| 2,573,471 | Malina et al. | Oct. 30, 1951 |
| 2,599,338 | Lifson | June 3, 1952 |
| 2,687,419 | Hillyer | Aug. 24, 1954 |

FOREIGN PATENTS

| | | |
|---|---|---|
| 461,671 | Great Britain | Feb. 17, 1937 |

OTHER REFERENCES

"Rockets," May-August 1946, page 7. Copy in Scientific Library.

Journal of American Rocket Society, No. 72, December 1947, pages 6, 7, 32. 52 J & R.